Sept. 19, 1939.  G. B. HARRISON  2,173,110
COLOR PHOTOGRAPHY
Filed Dec. 3, 1936  2 Sheets—Sheet 1

Inventor
Geoffrey Bond Harrison
By Stebbins Blenko & Parmelee, Attys

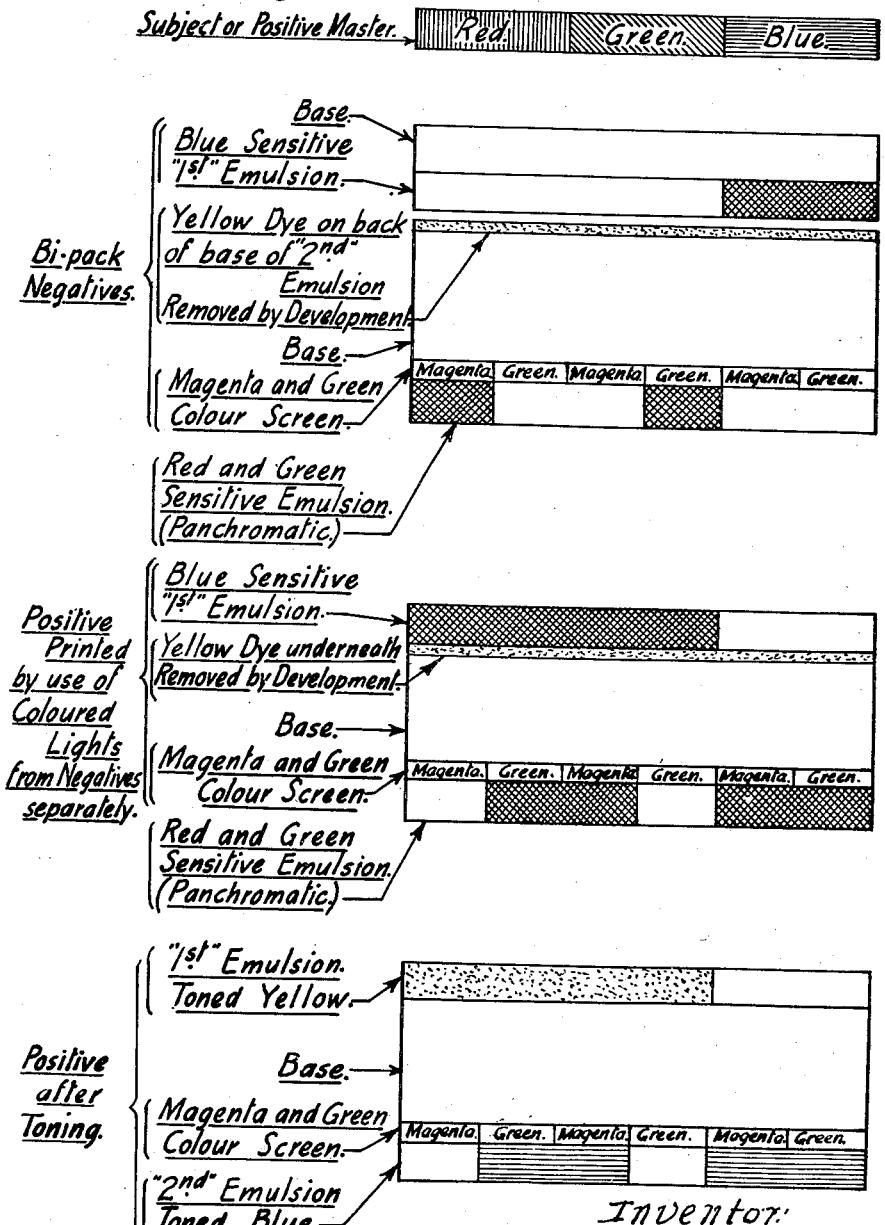

Patented Sept. 19, 1939

2,173,110

UNITED STATES PATENT OFFICE 2,173,110

COLOR PHOTOGRAPHY

Geoffrey Bond Harrison, Ilford, England, assignor to Ilford Limited, Ilford, Essex, England, a British company Application December 3, 1936, Serial No. 114,070
In Great Britain December 11, 1935

2 Claims. (Cl. 95—2)

This invention consists in improvements in or relating to color photography and has for its object to combine features of the additive and subtractive processes of color photography in advantageous form.

The invention is concerned with light sensitive photographic material of the kind (hereinafter referred to as the kind described) comprising two light sensitive layers, one (for convenience referred to as the first layer) sensitive to, or otherwise arranged to record, substantially only one of the three primary colors, and the other (referred to as the second layer) sensitive to, or otherwise arranged to record, substantially the other two primary colors in combination with a two-color screen associated with the second layer in such manner that the second layer may be exposed through the screen. Photographic material of this kind has already been proposed in U. S. Patent No. 1,877,709. When either layer is sensitive to a wider range than the primary color (or colors) which it is intended to record it is arranged to record only that color by employing means, e. g. suitable filters, to restrict the exposure to light of that color. For example, when the second emulsion is sensitive to more than the two colors it is to record and is to be exposed through the first emulsion then a suitable removable filter dye may be incorporated in the first emulsion.

The color screen may have colored elements of any desired shape but elements in the form of parallel lines are to be preferred.

According to the present invention light sensitive photographic material of the kind described, is characterised in that the two colors of the screen are (a) one of the two primary colors other than that to which the first layer is sensitive and (b) the color complementary to (a). The first light sensitive layer may be coated upon one side of a transparent support and the second light sensitive layer upon the other side of the same support whilst the two color screen is situated between the two light sensitive layers and preferably at that surface of the support bearing the second light sensitive layer. The light sensitive layers are preferably silver halide emulsions but they may be bichromated colloid or diazotype layers when they are to be used to record images of the colors to which these layers are sensitive, (e. g. blue) or they may be of other light sensitive materials.

The invention includes the method of processing exposed light sensitive photographic material of the characteristic kind according to the invention to produce an image in approximately natural colors which comprises the steps of treating the first layer (the layer sensitive to only one primary color) to produce a photographic image in a color complementary to the color recorded by it and treating the other layer to produce an image in the color to which the first layer is sensitive. The developed images may be colored by dye toning or by chemical toning or by other known suitable coloring means or the original emulsions may contain dyes or pigments which are differentially removed by suitable treatment.

The invention is particularly suitable for the production of colored copies from color separation negatives (or positives) which may be in the form of three separate records and each printed by means of light of the color of which it is a record or in the form of a single record on multi-color screen material in which case white light is used for printing.

Some specific examples of the invention will now be described with reference to the accompanying drawings in which:

Figure 4 is a diagram illustrating a method of taking and printing colored photographs.

Figure 1:
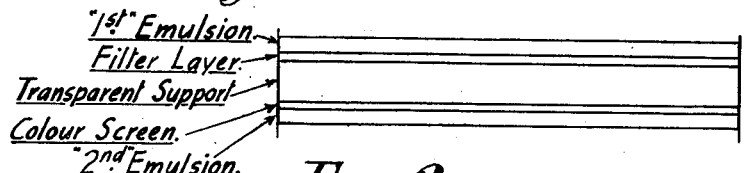
Figure 1 is a cross-section through one form of photographic material according to the invention.
Figure 2:
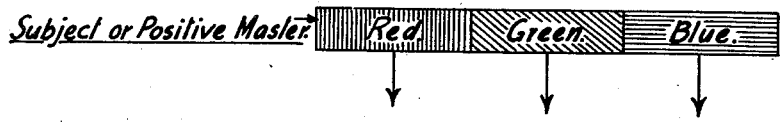
Figure 2 is a diagram of the subject and negative color records.
Figure 2:
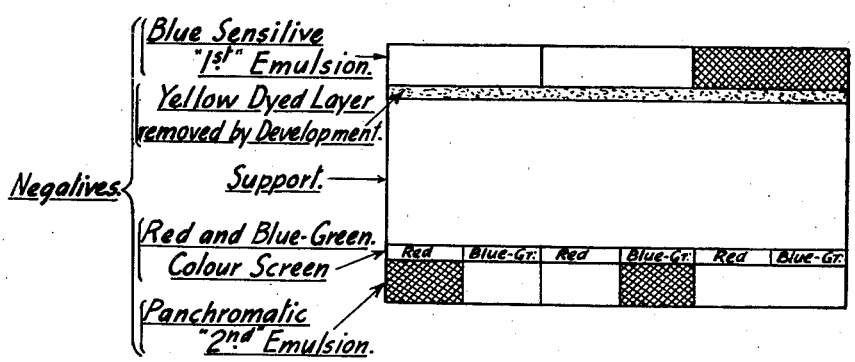
Figure 3:
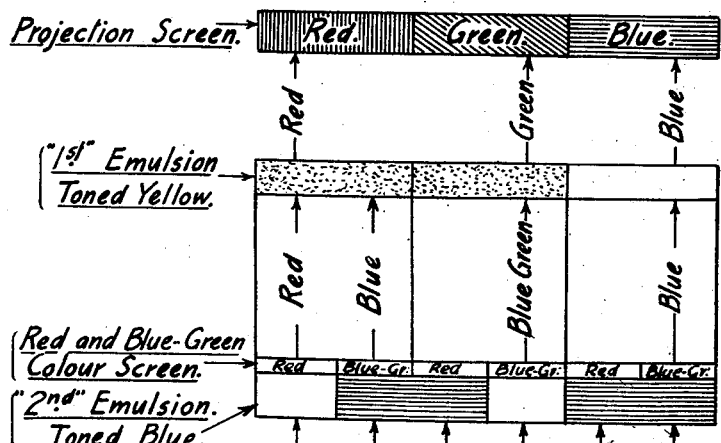
Figure 3 is a diagram of the positive produced by reversal and toning of the records illustrated in Figure 2, showing the effect on projection

The example illustrated in Figures 2 and 3 is of the application of the invention to the production of a copy from a master multi-color screen positive record—the colors of the screen on the master being blue, red and green. In this example the printing stock consists of a line screen having alternating lines of red and minus red (blue-green). Over the screen is coated a layer of a panchromatic emulsion (constituting the "second" emulsion) and on the opposite side of the support is coated a layer of blue sensitive emulsion (constituting the "first" emulsion) incorporating a removable yellow dye (shown in Figure 2 as a separate dyed layer for convenience in illustration).

The master is printed on to the printing stock with its emulsion in contact with the blue sensitive emulsion, using white light. The light passed by the blue elements of the master screen (constituting the blue record) prints on to the blue sensitive emulsion but is prevented from affecting the panchromatic emulsion by the yellow dye included in the first emulsion. The red and green components of the light pass through the first emulsion and through the two-color screen and print on to the panchromatic emulsion thus recording the red and green elements of the master picture behind the red and blue-green lines of the two-color screen respectively. Both emulsions are then developed, reversed and fixed and in place of the two silver images are formed color images, the image in the blue sensitive layer being converted to yellow and the image in the panchromatic layer being converted to blue. The yellow image may be produced, for example, by mercury toning and the blue image may be produced, for example, by using a tanning developer, washing the emulsion with hot water and bleaching to remove the silver to give a relief image in gelatin which is stained with a blue dye. The final positive produced in this manner is illustrated in Figure 3.

If desired, the master record or records may be in the form of a negative and in that case the images produced in the printing stock are developed without reversal to form positives.

In a second example separate red, green and blue color separation negatives are printed successively onto the printing stock using for each negative light of the color of which it is a record. The printing stock consists of a silver chloride gaslight emulsion sensitized to the red (it will also be sensitive to ultra-violet but not to the near blue), a second emulsion which is orthochromatic (i. e. sensitive to blue and green, but not to red light), and an intermediate color screen which has lines of blue and yellow. The stock is printed by means of appropriately colored lights devoid of ultra-violet rays with the gaslight emulsion in contact with each of the negatives in turn. After exposure and development the first image is colored blue-green by dye mordanting or chemical toning and the second emulsion is developed with a tanning developer, is hot water washed and stained red.

Various combinations of the sensitivities of the two emulsions and the colors of the two-color screen which may be employed are given in the following table:

in which the first emulsion is sensitive to blue, the screen colors are red and blue-green and the second emulsion is sensitive to red and green, it will be seen that the red of the subject on a positive master will produce on the negative copy a black image only behind the red elements of the screen because the first emulsion is not sensitive to red and the blue-green elements of the screen will not pass red light. Similarly the green of the master will only be recorded behind the blue-green elements of the screen because the first emulsion is not sensitive to green and the red elements of the screen will not pass green light. The blue of the master will be recorded only on the first blue sensitive layer and not at all on the second layer because the yellow dye associated with the first emulsion either in the emulsion or coated in a separate layer beneath the emulsion prevents any blue light from reaching the second emulsion. When the copy has been developed and reversed and the first and second emulsions toned yellow and blue respectively the red of the picture will be reproduced on projection with white light as illustrated in Figure 3 by the selective action of the red elements of the screen. This red light will pass freely through the yellow toned first layer. Dilution of the red by blue-green light will be prevented by the blue image behind the adjacent blue-green elements of the screen and by the yellow image of the first layer. The green of the picture will be produced by the subtractive action of the blue-green elements of the screen combined with the subtractive action of the yellow toned image. No red light will be passed by the red elements of the screen because the blue image will have been formed behind these elements. The blue of the picture will be produced by the light passed by the blue image and the blue-green elements of the screen. This blue image will extend behind the adjacent red elements of the screen and will prevent light being passed by those elements.

When the invention is used for printing multicolor screen master records, it is preferred to employ filters in the light beam to ensure that the

| Light used in printing first emulsion (i. e., the color of the light to which the emulsion is sensitive) | Image thus produced is colored | Two line screen of colors | | Light used in printing second emulsion through screen | Image thus produced in second emulsion is colored |
| --- | --- | --- | --- | --- | --- |
| | | 1 | 2 | | |
| Blue | Yellow | Red | Blue-green | Yellow | Blue. |
| Green | Magenta | do | do | Magenta | Green. |
| Red | Blue-green | Blue | Yellow | Blue-green | Red. |
| Green | Magenta | do | do | Magenta | Green. |
| Red | Blue-green | Green | Magenta | Blue-green | Red. |
| Blue | Yellow | do | do | Yellow | Blue. |

The record printed on the second emulsion should be of only two of the three primary colors and if this emulsion is sensitive to more than these two colors, as in the first example described above, it is necessary to employ a removable dyed layer between the second emulsion and the master. This layer may be prepared in the manner already described by dyeing the first emulsion with a removable dye or a separate layer incorporating a removable dye may be employed underneath the first layer or between the second layer and the support.

Taking the case illustrated in Figures 2 and 3 light does not contain any components of color which would be passed by two or more of the master screen elements of different color. Light of such composition may also be obtained by the method described in U. S. Patent No. 2,024,522, and the expression "white light" as used herein is intended to include light having such composition.

In order to produce the minimum of diffusion in the second layer due to the scatter of the light taking place in the first layer and the separation between the two layers, the first emulsion should be as transparent (non-scattering) as possible, for example, a fine grained silver halide emulsion of low coating weight or a transparent light sensitive layer such as diazotype. If a light sensitive layer is used which produces some scatter such as a fine grained silver halide emulsion, the effect of the scatter on the definition of the finished print can be minimised by making the first layer (the one sensitive to only a single primary color) sensitive to red light, and toning it or coloring it blue-green because it is the blue-green image which is usually regarded as giving definition to the picture. The blue-green image would then be focussed on to the screen when projecting, giving definition to the picture (since the image is produced by printing in direct contact and will be perfectly sharp). A further feature of this procedure is that the two color screen would itself be to a certain extent out of focus and the geometrical structure of the screen would be practically invisible if its dimensions on the film were sufficiently small, for example, a two line screen bearing 40 lines to the millimetre.

It is to be understood that although the principal application of the invention is to the production of copies in color, the invention may also be applied to the taking of master photographs in the camera. In the example of this application of the invention which is illustrated in Figure 4 a bipack is used having on one film base the emulsion sensitive to only one of the primary colors and on the other film base a two-color screen and the second emulsion. The two films are placed in the camera, as shown in Figure 4, with the base of the first emulsion facing the lens and the color screen between the two emulsions. The records produced in this way are then used as negatives in the process described above for printing on to the printing stock described which is then processed and colored to produce a colored positive. Alternatively the master records could be developed and reversed to form positives and then colored in the manner already described to convert the master material to a colored positive, means being employed to secure the two images in registration.

In a further alternative method material as previously described and comprising a transparent support bearing light sensitive silver emulsion layers on each side and a two-color screen between the emulsion layers may be exposed in a camera to form negative images in both emulsion layers which are then chemically reversed to yield positive images which in turn are converted into dye images as described to give a positive photograph in color for direct viewing or projection purposes.

An alternative material suitable either for taking or for copying has the two emulsion layers coated on the color screen side of the base and the emulsion layers are developed and colored by a method similar to that employed in the "Kodachrome" process. That is to say, the two layers would have their developed images bleached and then both toned to the color required for the layer next to the screen, the upper layer would then again be bleached and would finally be dyed to the color required for that layer. Any other known method of selectively color toning two superposed emulsions could be employed.

In cases where during exposure the emulsion sensitive to only one of the primary colors is further from the subject than the emulsion layer sensitive to the other two colors it is important that the emulsion recording the two colors should be sensitive to those two colors only as otherwise a correcting filter would be required which would interfere with the recording of the third color by the layer sensitive to that color.

This invention has many advantages over the usual three color screen additive process one of which is that the luminosity of images projected on to a screen can be substantially increased. In the three-color additive screen process owing to the introduction of the color screen, the light intensity of the transmitting beam and the projected image is reduced theoretically to one third because each color element of the screen transmits only one third of the total light incident upon it, and in practice owing to imperfections and practical difficulties in the filters, the actual reduction may be considerably greater than this. In the present invention since only a two-color screen is involved, the theoretical reduction in intensity of the transmitted beam and the projected image is only one half and in practice owing to the nature of the screen and the process this figure should be more nearly approached than the figure of one third can be in the three-color additive screen process.

An advantage over most three-color subtractive processes is the ease with which a three-color record can be obtained using two sides of a single support in one printing operation and obviating the practical difficulties attendant upon any process involving super-imposition of three separate color records in exact register.

I claim:

1. The method of producing pictures in color from exposed light sensitive photographic material comprising two light sensitive layers, the first arranged to record substantially only one of the three primary colors and containing a latent color separation record of that color and the second arranged to record the other two primary colors and containing latent color separation records of those two colors produced by exposure through a two-color screen the colors of which are respectively (a) one of the two primary colors other than that which the first layer is arranged to record and (b) the color complementary to (a), the method consisting in treating the first layer to convert the latent record into an image in color complementary to the color of which it is a record and treating the second layer to convert the latent records of that layer into an image in the color which was recorded by the first layer.

2. The method of producing pictures in color which comprises the steps of exposing light sensitive material comprising two light sensitive layers, to produce in the first layer, which is arranged to record substantially only one of the three primary colors, a latent color separation record of that color and, by exposure through a two-color screen the colors of which are respectively (a) one of the two primary colors other than that which the first layer is arranged to record and (b) the color complementary to (a) to produce in the second layer, which is arranged to record the two primary colors other than that which the first layer is arranged to record latent color separation records of those colors, treating the first layer to convert the latent record into an image in color complementary to the color of which it is a record and treating the second layer to convert the latent records of that layer into an image in the color recorded by the first layer.

GEOFFREY BOND HARRISON.